Patented July 17, 1928.

1,677,869

UNITED STATES PATENT OFFICE.

WALTER H. PIERCE, OF WATERTOWN, MASSACHUSETTS, ASSIGNOR TO CARR FASTENER COMPANY, OF CAMBRIDGE, MASSACHUSETTS, A CORPORATION OF MAINE.

FASTENER.

Application filed November 18, 1924. Serial No. 750,596.

This invention aims to provide an improved separable fastener.

In the drawings, which illustrate a preferred embodiment of my invention:—

Figure 3:
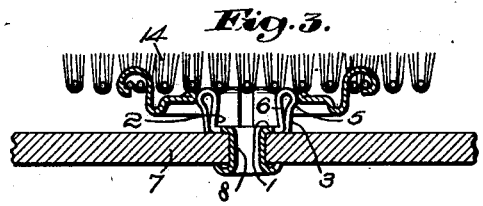
Figure 4:
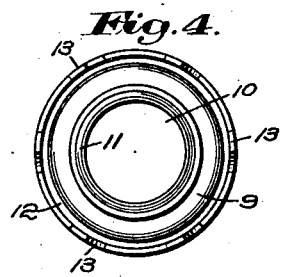
Figure 7:
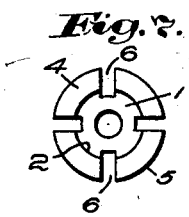
Figure 5:
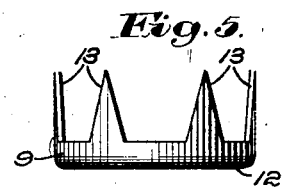
Figure 8:
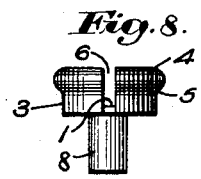
Figure 6:
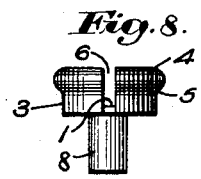
Figure 9:

Fig. 3 includes a front, a side and a rear elevation, respectively, of the stud.

Referring to the drawings, I have shown a separable fastener, particularly, though not exclusively, useful for securing flexible curtains or carpets to the metal parts of an automobile or the like. The stud is secured to the metal support and the socket may be secured in any suitable manner to a flexible support.

My invention comprises a socket-engaging part and an attaching part pressed, or otherwise formed, from a single piece of metal, whereas heretofore studs of the same general type were provided with an attaching part formed separately from the socket-engaging part and then secured thereto.

Figure 1:
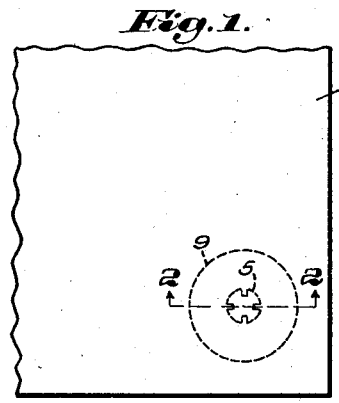
Figure 1 is an elevation view of the fastener, showing underlying parts in dotted lines.
Figure 2:
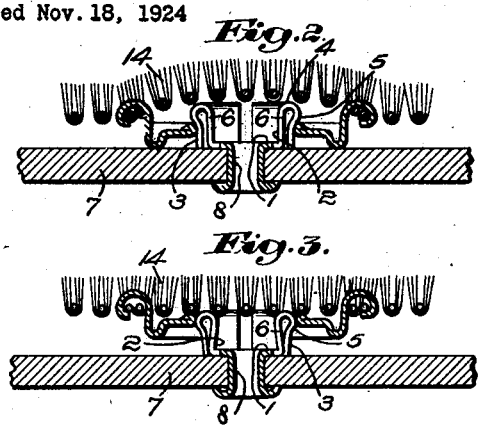
Fig. 2 is a section on the line 2—2 of Fig. 1.

Referring to Figs. 2 and 3, I have shown a stud which has been formed from a flat piece of metal passed through a series of dies. This stud is provided with a base 1, having an upstanding peripheral wall which terminates at an aperture 2 and forms the socket-engaging head 3 and neck portion 4 of the stud. The means for securing the stud to the metal support 5 comprises a tubular rivet portion 6 pressed from the base 1.

The aperture in the socket-engaging part serves a useful purpose when the stud is being secured to the support, and also when certain types of sockets (such, for instance, as carpet fastener sockets) are secured to the stud, as more fully hereinafter described. When securing the stud to the support 5, the rivet portion is passed through an aperture in the support so that a portion thereof is exposed at the inner face thereof. Then a suitable tool (not shown) is entered through the aperture 2 in the head 3 of the stud and held firmly against the base 1 of the stud, directly back of the rivet portion. While thus supported, the extended portion of the rivet, at the inner face of the support, is clenched outwardly and downwardly against the support, thus securing the stud thereto as shown in Fig. 2.

The stud is very strong and the upstanding wall is very rigid because the head 3 of the stud, which is in the form of an annular rim having a beaded portion adds considerable stiffness thereto.

The socket, selected for illustrative purposes, comprises a casing 7 secured to a flexible carrying medium 8 by an attaching rivet 9 held by a cap member 10 located at the opposite side of the carrying medium as shown in Fig. 2. The rivet passes through the carrying medium and is clenched against the casing in the manner shown. The socket casing 7 presents a stud-receiving aperture 11 intersected by a spring 12 for engagement with the neck of the stud.

When the stud and socket are engaged, the head of the stud contacts with the inner end of the casing 7 and the clenched-over portion of the rivet 9 passes through the aperture 2 in the stud (Fig. 2), thereby permitting the use of a relatively thin socket casing.

While I have shown and described a preferred embodiment of my invention, it will be understood that I have done so for purposes of clarification and that my invention is best defined in the following claims.

Claims:

1. A fastener stud having a base portion, an attaching part extending from said base portion, and an upstanding annular wall projecting upwardly from said base portion to provide a stud head and neck for cooperative engagement with a suitable socket, said wall extending upwardly outwardly and then inwardly and having its free edge terminating about an aperture in the head of said stud through which a suitable tool may be inserted to back support the attaching part when said stud is being secured to a carrying medium.

2. A hollow pressed stud comprising a socket-engaging portion having a ring-like head terminating at an aperture located at the outer end of the socket-engaging part, a neck, a base extending inwardly from said neck, and a tubular rivet pressed from said base, said rivet adapted to be back-supported during attachment to a support by inserting a tool through said aperture to seat against said base.

In testimony whereof I have signed my name to this specification.

WALTER H. PIERCE.

July 17, 1928.

W. H. PIERCE 1,677,870

FASTENER

Filed Nov. 18, 1924

Inventor:
Walter H. Pierce,
by Emery Booth Janney Varney
Attys.